(12) United States Patent
Cheng et al.

(10) Patent No.: US 12,373,107 B2
(45) Date of Patent: Jul. 29, 2025

(54) METHOD TO MANAGE PERIODIC DRAM REFRESH AND MAINTENANCE SCHEDULING FOR PREDICTABLE DRAM DATA ACCESS

(71) Applicant: Groq, Inc., Mountain View, CA (US)

(72) Inventors: Albert Cheng, Bellevue, WA (US); Michael Bye, Chippewa Falls, WI (US); Rahul Shah, Milpitas, CA (US)

(73) Assignee: Groq, Inc., Mountain View, CA (US)

( * ) Notice: Subject to any disclaimer, the term of this patent is extended or adjusted under 35 U.S.C. 154(b) by 41 days.

(21) Appl. No.: 18/538,448

(22) Filed: Dec. 13, 2023

(65) Prior Publication Data
US 2024/0192855 A1    Jun. 13, 2024

Related U.S. Application Data

(60) Provisional application No. 63/432,322, filed on Dec. 13, 2022.

(51) Int. Cl.
*G06F 3/06* (2006.01)

(52) U.S. Cl.
CPC .......... *G06F 3/0611* (2013.01); *G06F 3/0659* (2013.01); *G06F 3/0673* (2013.01)

(58) Field of Classification Search
CPC ..... G06F 3/0611; G06F 3/0659; G06F 3/0673
See application file for complete search history.

(56) References Cited

U.S. PATENT DOCUMENTS

| | | | |
|---|---|---|---|
| 2020/0026562 A1* | 1/2020 | Bahramshahry | H04L 41/5009 |
| 2020/0243154 A1* | 7/2020 | Sity | G06F 11/1068 |
| 2022/0122215 A1* | 4/2022 | Ray | G06F 7/575 |
| 2023/0102089 A1* | 3/2023 | Bellubbi | G06F 11/0757 714/55 |

* cited by examiner

*Primary Examiner* — Tim T Vo
*Assistant Examiner* — Janice M. Girouard
(74) *Attorney, Agent, or Firm* — Dority & Manning, P.A.

(57) ABSTRACT

When reading and writing DRAM (dynamic random-access memory), the latency and bandwidth is often unpredictable with large variations. One reason is because all the DRAM memory banks require periodic refreshes and maintenance cycles that interrupt these accesses. DRAM refresh and maintenance cycles are synchronized with the read/write accesses in a mutually exclusive manner, hence, preventing the accesses from being interfered with by a refresh or maintenance cycle resulting in predictable latency and bandwidth performance during read/write operations.

22 Claims, 8 Drawing Sheets

METHOD TO MANAGE PERIODIC DRAM REFRESH AND MAINTENANCE SCHEDULING FOR PREDICTABLE DRAM DATA ACCESS

CROSS-REFERENCE TO RELATED APPLICATIONS

This application claims the benefit of priority to U.S. Provisional Application No. 63/432,322 filed Dec. 13, 2022, and entitled "A METHOD TO MANAGE PERIODIC DRAM REFRESH AND MAINTENANCE SCHEDULING FOR PREDICTABLE DRAM DATA ACCESS," the entirety of which is expressly incorporated herein by reference.

FIELD(S) OF TECHNOLOGY

This disclosure has general significance in the field of power management in processors, in particular, significance for the following topics: Deterministic DRAM. This information is limited to use in the searching of the prior art.

BACKGROUND

The increasing reliance of modern industry on artificial intelligence has resulted in a growing demand for specialized microprocessors that perform the tensor calculations (such as vector-matrix and matrix-matrix multiplications) important to many artificial intelligence techniques such as gradient descent techniques for the training of artificial neural networks. Some of these tensor processors perform over one trillion floating point operations (teraflops) per second, which not surprisingly, require large amounts of power.

Most of the time, these processors use DRAM or dynamic random access memory, as its primary memory for storing weights and activations. Poor timing predictability of DRAM has been a long-standing challenge in the real-time systems. Indeed, combining DRAM which is inherently non-deterministic with a deterministic processor is a fundamental problem that prevents efficient and predictable real-time computing.

Today, all DRAM accesses are non-deterministic in terms of read and write latency and bandwidth. When a system performs a series of reads or writes from/to DRAM memory, the latency of the transactions being completed can vary greatly and unpredictably. This coincides with most computer systems being non-deterministic, where the runtime of the same software program can change from one run to another. These systems often tolerate this large DRAM access variance by containing levels of SRAM (static random-access memory) caches in front of the DRAM to alleviate this issue as these caches have much shorter and more predictable latencies. However, not only are these data cache subsystems complex in nature, these large unpredictable accesses from the DRAM introduce non-determinism into the system which is highly undesirable for performance. For a computer system that is deterministic or mostly deterministic, the need to eliminate or reduce some of these unpredictable factors to DRAM accesses is highly desirable, if not crucial, for it to perform well and function correctly.

There are many reasons that cause DRAM accesses to be non-deterministic. One of the reasons is because unlike SRAM, where its data is retained as long as power is applied, DRAM loses its data integrity over time even if power is applied continuously. In order for DRAM to retain all of its data, DRAM controllers that manage access to the DRAM are required to periodically recharge, or refresh, all the DRAM data content. Each of these recharge events is called a "refresh" cycle. When the computer system reads or writes the DRAM, it makes a request to the DRAM controller. If the controller happens to be busy refreshing the DRAM, the request will have to wait until the end of the refresh cycle, introducing non-determinism to the access latency and bandwidth.

Another reason for the non-deterministic behavior is the DRAM controllers also need to perform other routine maintenance to the DRAM periodically, such as signal level retraining and other recalibration related characteristics to/from the DRAM that might change over time. This activity is referred to as "maintenance updates," which can take a relatively long period of time to finish. Without these maintenance updates, the signaling to/from the DRAM may become unreliable. If the system happens to make a read/write request to the DRAM while an update is being performed, the request will wait until the update is finished, again causing an unpredictable long latency and impacting bandwidth performance.

A computer system here can be considered as a combination of hardware and system level software that hosts the running of one or more compiled software programs (applications). The DRAM memory is accessed by the system through a pool of DRAM controllers. Though the DRAM and the DRAM controllers are part of the overall system, they usually function independently, and hence are considered to be separate entities from the computer system perspective. An example of such a system is illustrated in FIG. 3. The DRAM memory is often partitioned into different independent memory regions, where each region is accessed by a set of wires called a "channel". Each region is further organized into different memory banks, where each bank contains multiple rows and columns of memory bit cells, like a 2-dimensional array of bits. There is usually a separate DRAM controller for each region. The DRAM controller is responsible for managing all data access for the system and for performing all refresh and maintenance cycles to that region.

To refresh the memory, the DRAM controller often has an option to use an "all-bank" refresh scheme where the banks in a region are refreshed all at once on a periodic basis. This method is simple but also prevents any access from the system to all the banks in the region until this all-bank refresh cycle is completed. Another option is for the DRAM controller to use a "per-bank" refresh scheme where only one bank (or perhaps a few banks) is refreshed at a time. The DRAM controller would thus spread out the refresh of all the banks over a period of time. This method is more complex for the DRAM controller to manage, but when a particular bank in a region is being refreshed, the DRAM controller will still allow access by the system to banks that are not being refreshed. For access to a bank that happens to be being refreshed, the access would still have to wait and will be delayed by a period of time that may not be consistent (or predictable) over time, temperature or voltage.

SUMMARY

This Summary, together with any Claims, is a brief set of signifiers for at least one ECIN (which can be a discovery, see 35 USC 100(a); and see 35 USC 100(j)), for use in commerce for which the Specification and Drawings satisfy 35 USC 112.

One main reason refresh cycles and maintenance cycles collide with the access requests made by the computer system is because the DRAM controllers function independently from the computer system. The computer system makes access requests without knowing when the DRAM controller is exercising these cycles, and vice versa. In one or more ECINs disclosed herein, the two are made aware of each other's scheduling and guarantee not to collide so that conflicts between DRAM controller activity and computer system access requests can be avoided.

In one or more ECINs disclosed herein, a mechanism is introduced to have the computer system make DRAM access requests in a schedule that does not collide with the DRAM controller's refresh and maintenance schedules. By doing so, all requests from the system are guaranteed not to collide with the DRAM controller being in the middle of performing a refresh or maintenance cycle. Hence, requests will not be delayed by the DRAM controller. This effectively allows all DRAM read/write accesses to have a more predictable latency and bandwidth performance.

This Summary does not completely signify any ECIN. While this Summary can signify at least one essential element of an ECIN enabled by the Specification and Figures, the Summary does not signify any limitation in the scope of any ECIN.

DRAWINGS

The following Detailed Description, Figures, and Claims signify the uses of and progress enabled by one or more ECINs. All of the Figures are used only to provide knowledge and understanding and do not limit the scope of any ECIN. Such Figures are not necessarily drawn to scale.

Figure 1:
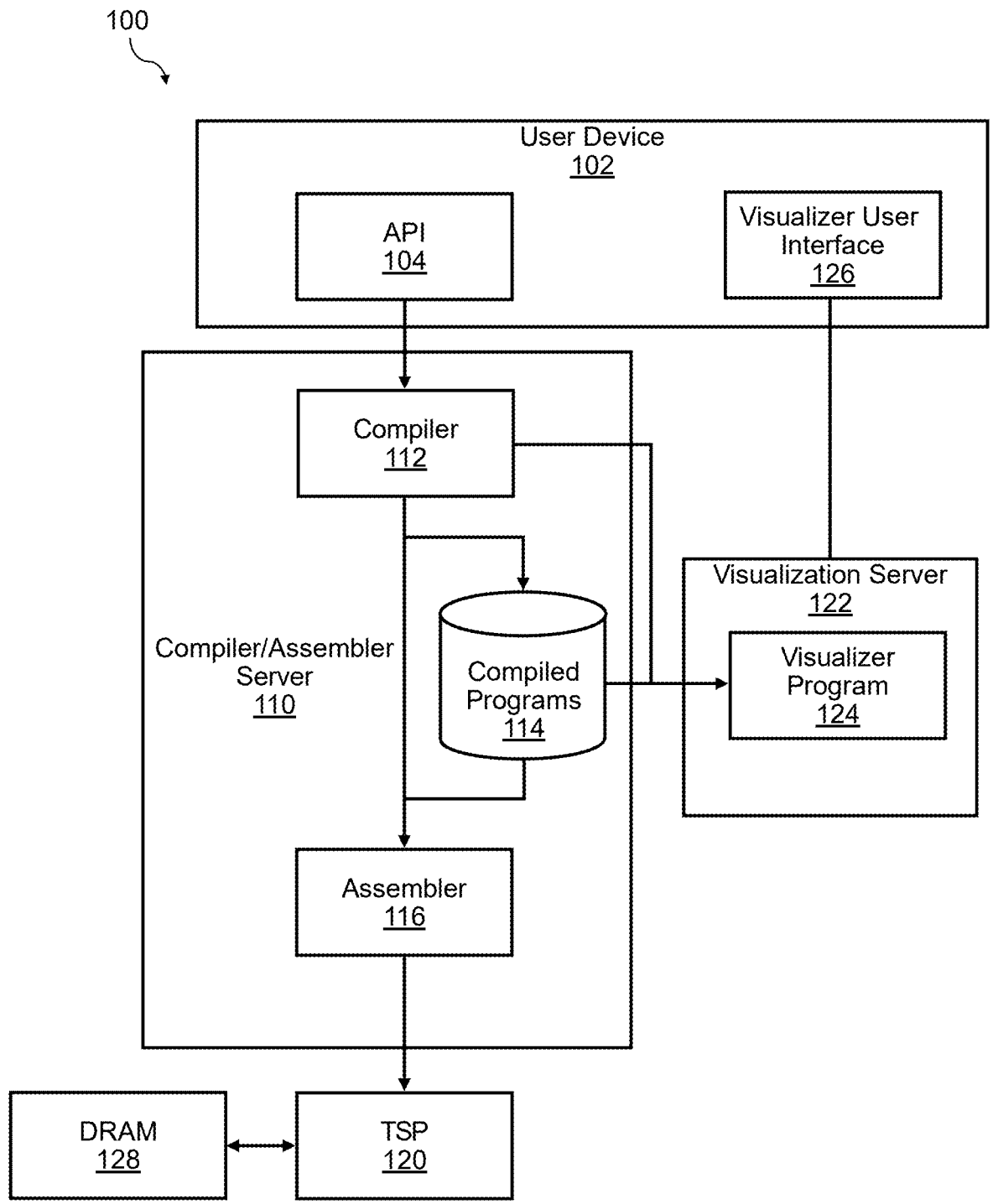
FIG. 1 depicts a system for compiling a program to be executed on a specialized processor, in accordance with some embodiments.

The Figures can have the same, or similar, reference signifiers in the form of labels (such as alphanumeric symbols, e.g., reference numerals), and can signify a similar or equivalent function or use. Further, reference signifiers of the same type can be distinguished by appending to the reference label a dash and a second label that distinguishes among the similar signifiers. If only the first label is used in the Specification, its use applies to any similar component having the same label irrespective of any other reference labels. A brief list of the Figures is below.

In the Figures, reference signs can be omitted as is consistent with accepted engineering practice; however, a skilled person will understand that the illustrated components are understood in the context of the Figures as a whole, of the accompanying writings about such Figures, and of the embodiments of the claimed inventions.

DETAILED DESCRIPTION

The Figures and Detailed Description, only to provide knowledge and understanding, signify at least one embodiment or a claimed invention (ECIN). To minimize the length of the Detailed Description, while various features, structures or characteristics can be described together in a single embodiment, they also can be used in other embodiments without being written about. Variations of any of these elements, and modules, processes, machines, systems, manufactures or compositions disclosed by such embodiments and/or examples are easily used in commerce. The Figures and Detailed Description signify, implicitly or explicitly, advantages and improvements of at least one ECIN for use in commerce.

In the Figures and Detailed Description, numerous specific details can be described to enable at least one ECIN. Any embodiment disclosed herein signifies a tangible form of a claimed invention. To not diminish the significance of the embodiments and/or examples in this Detailed Description, some elements that are known to a skilled person can be combined together for presentation and for illustration purposes and not be specified in detail. To not diminish the significance of these embodiments and/or examples, some well-known processes, machines, systems, manufactures or compositions are not written about in detail. However, a skilled person can use these embodiments and/or examples in commerce without these specific details or their equivalents. Thus, the Detailed Description focuses on enabling the inventive elements of any ECIN. Where this Detailed Description refers to some elements in the singular tense, more than one element can be depicted in the Figures and like elements are labeled with like numerals.

FIG. 1 illustrates a system 100 for compiling programs to be executed on a tensor processor according to an embodiment. The system 100 includes a user device 102, a server 110, and a processor 120. Each of these components, and their sub-components (if any) are described in greater detail below. Although a particular configuration of components is described herein, in other embodiments the system 100 may have different components and these components would perform the functions of the system 100 in a different order or using a different mechanism. For example, while FIG. 1 illustrates a single server 110, in other embodiments, compilation, assembly, and power usage functions are performed on different devices. For example, in some embodiments, at least a portion of the functions performed by the server 110 are performed by the user device 102.

The user device 102 comprises any electronic computing device, such as a personal computer, laptop, or workstation, that uses an Application Program Interface (API) 104 to construct programs to be run on the processor 120. The server 110 receives a program specified by the user at the user device 102, and compiles the program to generate a compiled program 114. In some embodiments, a compiled program 114 enables a data model for predictions that processes input data and makes a prediction from the input data. Examples of predictions are category classifications made with a classifier, or predictions of time series values. In some embodiments, the prediction model describes a machine learning model that includes nodes, tensors, and weights. In one embodiment, the prediction model is specified as a TensorFlow model, the compiler 112 is a Tensor- Flow compiler and the processor 120 is a tensor processor. In another embodiment, the prediction model is specified as a PyTorch model, the compiler is a PyTorch compiler. In other embodiments, other machine learning specification languages and compilers are used. For example, in some embodiments, the prediction model defines nodes representing operators (e.g., arithmetic operators, matrix transformation operators, Boolean operators, etc.), tensors representing operands (e.g., values that the operators modify, such as scalar values, vector values, and matrix values, which may be represented in integer or floating-point format), and weight values that are generated and stored in the model after training. In some embodiments, where the processor 120 is a tensor processor having a functional slice architecture, the compiler 112 generates an explicit plan for how the processor will execute the program, by translating the program into a set of operations that are executed by the processor 120, specifying when each instruction will be executed, which functional slices will perform the work, and which stream registers will hold the operands. This type of scheduling is known as "deterministic scheduling". This explicit plan for execution includes information for explicit prediction of excessive power usage by the processor when executing the program.

The assembler 116 receives compiled programs 114, generated by the compiler 112, and performs final compilation and linking of the scheduled instructions to generate a compiled binary. In some embodiments, the assembler 114 maps the scheduled instructions indicated in the compiled program 112 to the hardware of the processor 120, and then determines the exact component queue in which to place each instruction.

The processor 120, e.g., in one embodiment is a hardware device with a massive number of matrix multiplier units that accepts a compiled binary assembled by the assembler 116, and executes the instructions included in the compiled binary. The processor 120 typically includes one or more blocks of circuitry for matrix arithmetic, numerical conversion, vector computation, short-term memory, and data permutation/switching. Once such processor 120 is a tensor processor having a functional slice architecture and it is coupled to external DRAM 128. In some embodiments, the processor 120 comprises multiple tensor processors connected together. In some embodiments, the compiled program is executed on visualization server 122 runs a visualizer engine 124 to show how the data flows through processor 120 under control of the compiled program. The visualization is displayed on the visualizer UI 126 in a graphical manner.

Example Processor

Figure 2A:
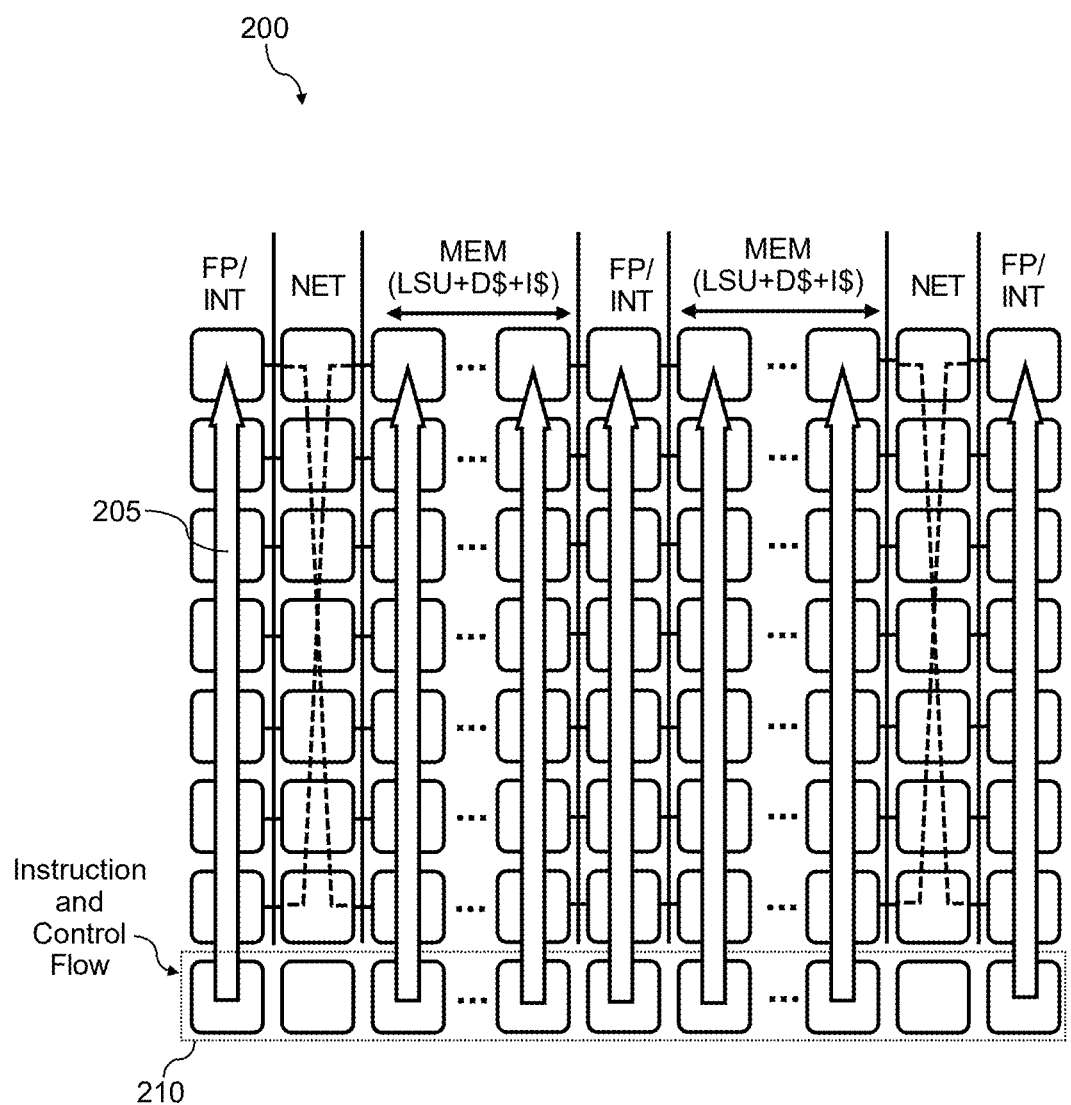
FIGS. 2A and 2B illustrate instruction and data flow in a processor having a functional slice architecture, in accordance with some embodiments.
Figure 2B:
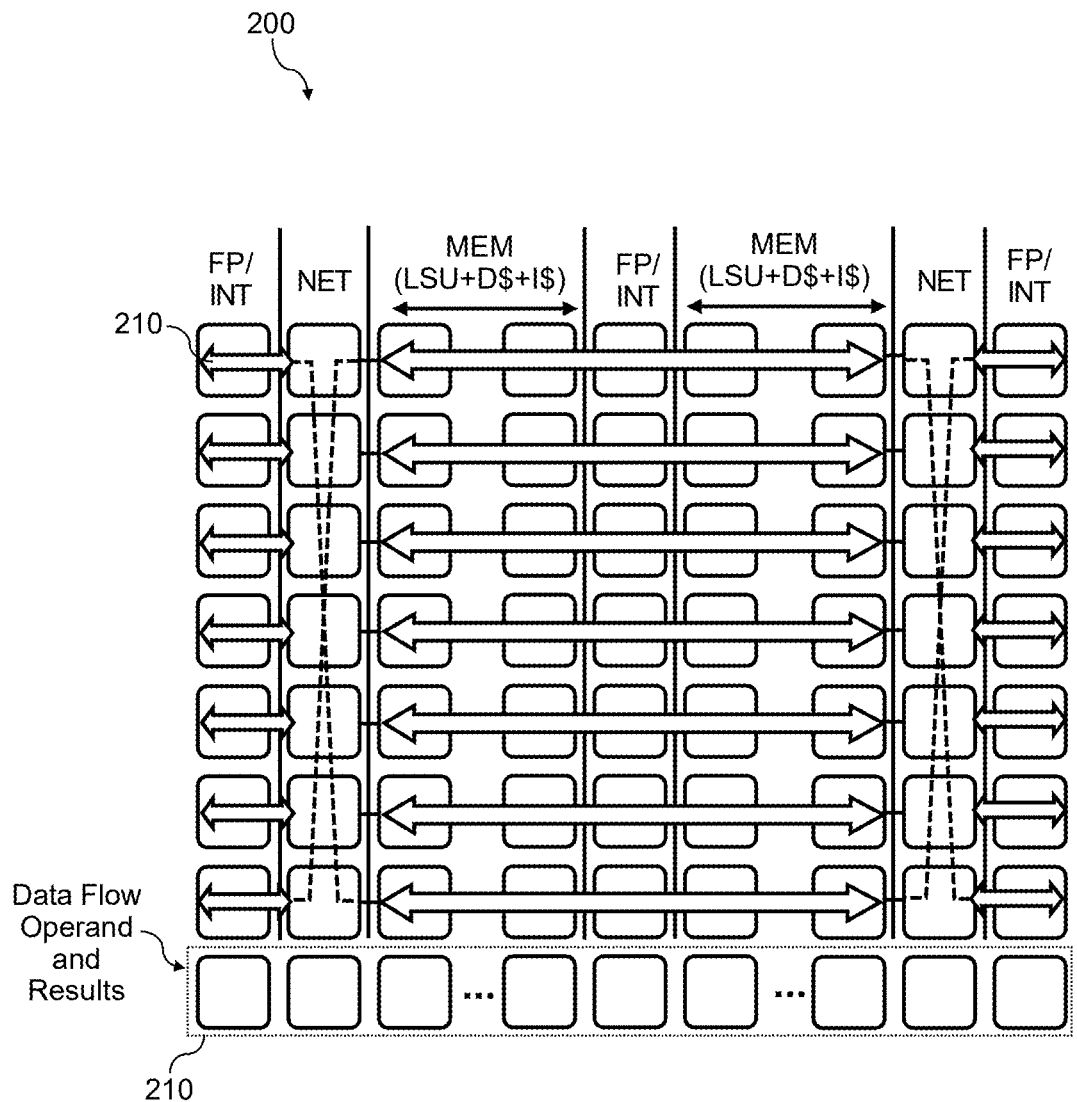
Figure 3:
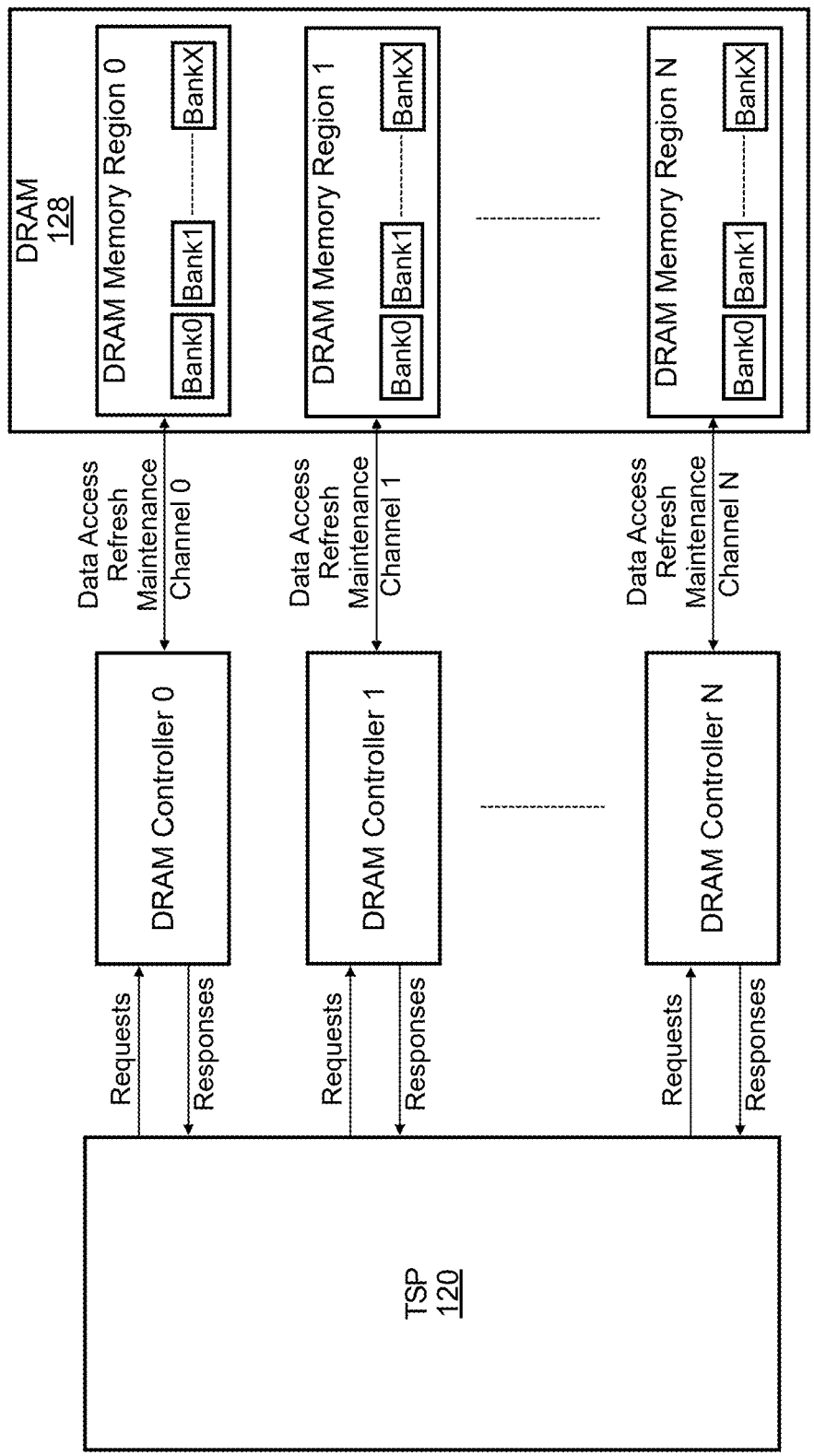
FIG. 3 depicts one arrangement between a processor and a traditional memory system in accordance with some embodiments.

FIGS. 2A and 2B illustrate instruction and data flow in a processor having a functional slice architecture, in accordance with some embodiments. One enablement of processor 200 is as an application specific integrated circuit (ASIC), and corresponds to processor 120 illustrated in FIG. 1.

The functional units of processor 200 (also referred to as "functional tiles") are aggregated into a plurality of functional process units (hereafter referred to as "slices") 205, each corresponding to a particular function type in some embodiments. For example, different functional slices of the processor correspond to processing units for MEM (SRAM), VXM (vector execution module), MXM (matrix execution module), NIM (numerical interpretation module), and SXM (switching and permutation module). In other embodiments, each tile may include an aggregation of functional units such as a tile having both MEM and execution units by way of example. As illustrated in FIGS. 2A and 2B, each slice corresponds to a column of N functional units extending in a direction different (e.g., orthogonal) to the direction of the flow of data. The functional units of each slice can share an instruction queue (not shown) that stores instructions, and an instruction control unit (ICU) 210 that controls execution flow of the instructions. The instructions in a given instruction queue are executed only by functional units in the queue's associated slice and are not executed by another slice of the processor. In other embodiments, each functional unit has an associated ICU that controls the execution flow of the instructions.

Processor 200 also includes communication lanes to carry data between the functional units of different slices. Each communication lane connects to each of the slices 205 of processor 200. In some embodiments, a communication lane 220 that connects a row of functional units of adjacent slices is referred to as a "super-lane", and comprises multiple data lanes, or "streams", each configured to transport data values along a particular direction. For example, in some embodiments, each functional unit of processor 200 is connected to corresponding functional units on adjacent slices by a super-lane made up of multiple lanes. In other embodiments, processor 200 includes communication devices, such as a router, to carry data between adjacent functional units.

By arranging the functional units of processor 200 into different functional slices 205, the on-chip instruction and control flow of processor 200 is decoupled from the data flow. Since many types of data are acted upon by the same set of instructions, what is important for visualization is visualizing the flow of instructions, not the flow of data. For some embodiments, FIG. 2A illustrates the flow of instructions within the processor architecture, while FIG. 2B illustrates the flow of data within the processor architecture. As illustrated in FIGS. 2A and 2B, the instructions and control signals flow in a first direction across the functional units of processor 200 (e.g., along the length of the functional slices 205), while the data flows 220 flow in a second direction across the functional units of processor 200 (e.g., across the functional slices) that is non-parallel to the first direction, via the communication lanes (e.g., super-lanes) connecting the slices.

In some embodiments, the functional units in the same slice execute instructions in a 'staggered' fashion where instructions are issued tile-by-tile within the slice over a period of N cycles. For example, the ICU for a given slice may, during a first clock cycle, issues an instruction to a first tile of the slice (e.g., the bottom tile of the slice as illustrated in FIG. 1B, closest to the ICU of the slice), which is passed to subsequent functional units of the slice over subsequent cycles. That is, each row of functional units (corresponding to functional units along a particular super-lane) of processor 200 executes the same set of instructions, albeit offset in time, relative to the functional units of an adjacent row.

The functional slices of the processor are arranged such that operand data read from a memory slice is intercepted by different functional slices as the data moves across the chip, and results flow in the opposite direction where they are then written back to memory. For example, a first data flow from a first memory slice flows in a first direction (e.g., towards the right), where it is intercepted by a VXM slice that performs a vector operation on the received data. The data flow then continues to an MXM slice which performs a matrix operation on the received data. The processed data then flows in a second direction opposite from the first direction (e.g., towards the left), where it is again intercepted by VXM slice to perform an accumulate operation, and then written back to the memory slice.

In some embodiments, the functional slices of the processor are arranged such that data flow between memory and functional slices occur in both the first and second directions. For example, a second data flow originating from a second memory slice that travels in the second direction towards a second slice, where the data is intercepted and processed by VXM slice before traveling to the second MXM slice. The results of the matrix operation performed by the second MXM slice then flow in the first direction back towards the second memory slice.

In some embodiments, stream registers are located along a super-lane of the processor, in accordance with some embodiments. The stream registers are located between functional slices of the processor to facilitate the transport of data (e.g., operands and results) along each super-lane. For example, within the memory region of the processor, stream registers are located between sets of four MEM units. The stream registers are architecturally visible to the compiler, and serve as the primary hardware structure through which the compiler has visibility into the program's execution. Each functional unit of the set contains stream circuitry configured to allow the functional unit to read or write to the stream registers in either direction of the super-lane. In some embodiments, each stream register is implemented as a collection of registers, corresponding to each stream of the super-lane, and sized based upon the basic data type used by the processor (e.g., if the TSP's basic data type is an INT8, each register may be 8-bits wide). In some embodiments, in order to support larger operands (e.g., FP16 or INT32), multiple registers are collectively treated as one operand, where the operand is transmitted over multiple streams of the super-lane. One or more DRAM arrays are electrically coupled to processor 120. This pool of closely coupled DRAM is useful for storing program instructions and data (collectively referred to as data). In one embodiment, data is moved directly from a DRAM array onto a stream register through an interface circuit (C2C) and then transported to a functional element. Results produced by the functional element are then written back to a stream register and, in some applications, transported and written to one of the DRAM arrays.

Figure 4:
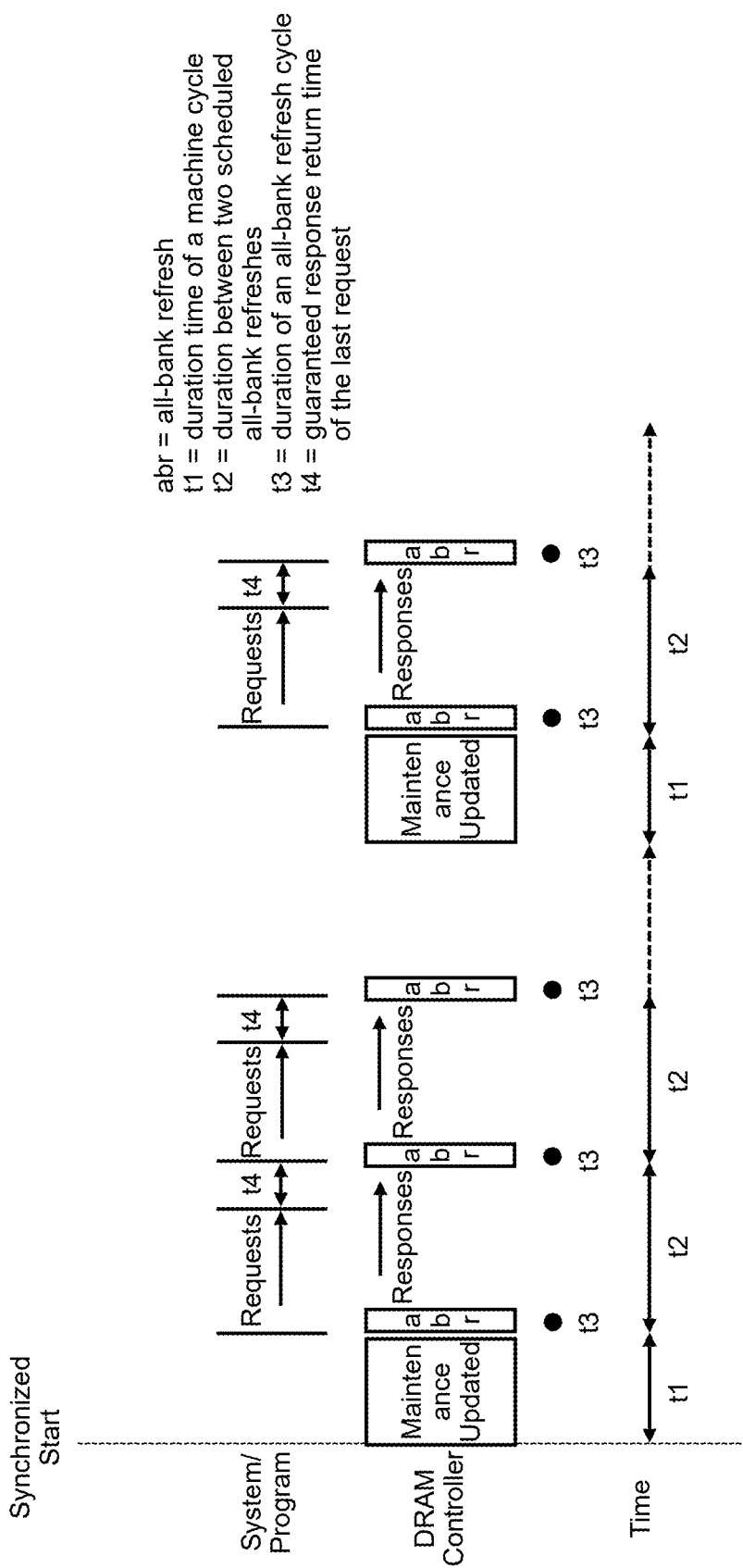
FIG. 4 depicts scheduling between the processor requests and the refresh/maintenance cycles of the DRAM used in some embodiments disclosed herein.

This invention introduces a scheme such that all DRAM requests are guaranteed to be mutually exclusive from the refresh and maintenance cycles of the DRAM, hence, avoiding conflict between the two and obtaining much more predictable latency and bandwidth performance. An example of this scheduling between the system requests and the refresh/maintenance cycles of the DRAM controller are shown in FIG. 4. In this example, the DRAM controller uses the "all-bank" method to refresh all the banks at once, periodically. Because the system is aware of when and how long each all-bank refresh and maintenance cycle takes, it can make requests at the appropriate time to avoid any conflicts. The timing window for when the system is allowed to make requests is called a "request window". However, the system must also be aware of when to stop making a request to the DRAM in a window to ensure that a refresh or maintenance cycle would not be starting before the response of that request can be returned (denoted as t4 in FIG. 4). Depending on the type of DRAM being used, this t4 value may be different, and on the prior request sequence (e.g. consecutive address sequence versus random address sequence). However, since the compiler is aware of the request pattern and DRAM access latency, it can adjust accordingly to avoid this conflict. This is noted as the t4-overhead.

Figure 5:
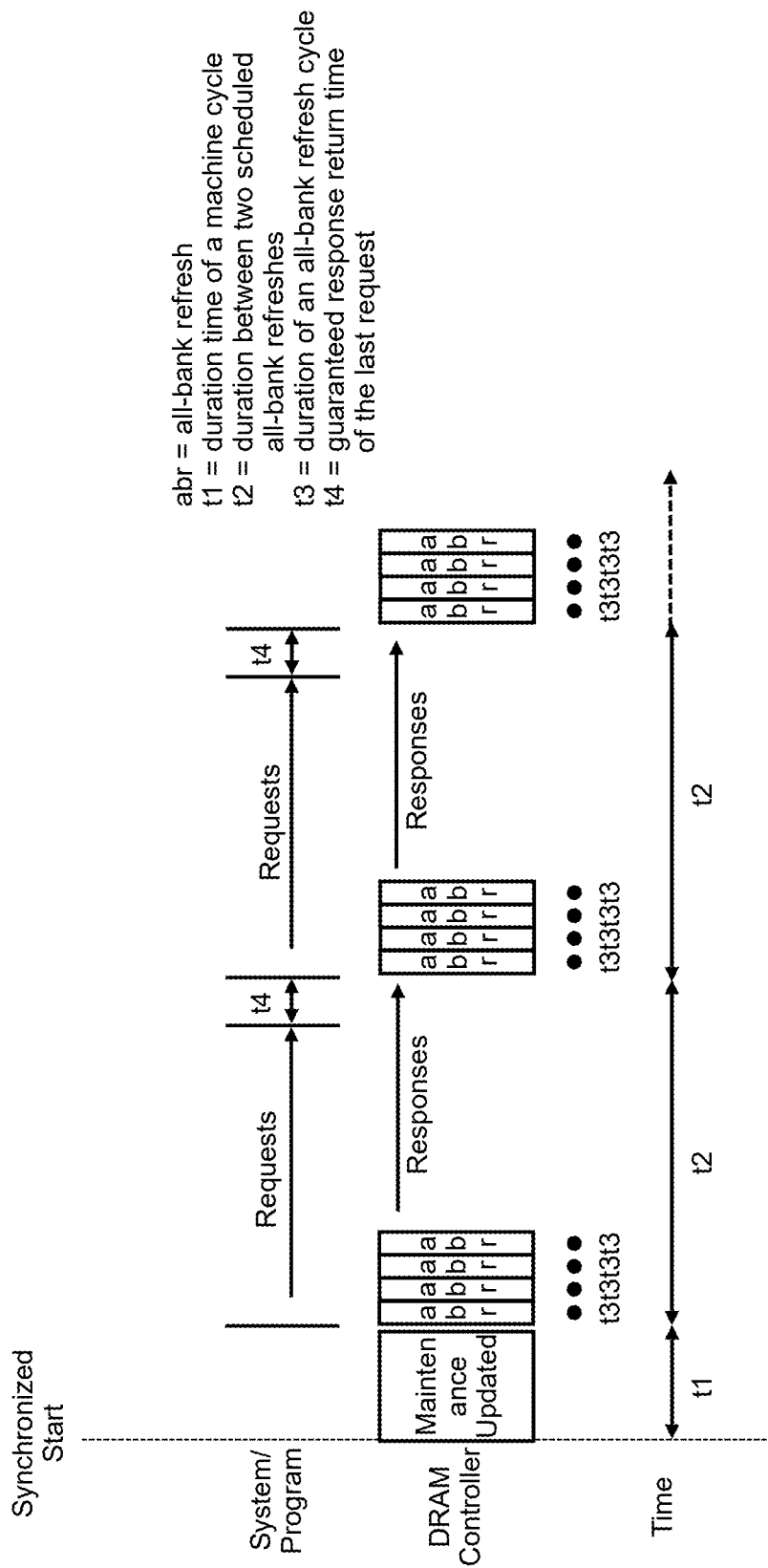
FIG. 5 depicts a DRAM device that allows a group of multiple all-bank refreshes to be issued in a sequential manner in accordance with some embodiments disclosed herein.

This general concept applies to different types of DRAM, including HBM*, DDR*, LPDDR*, and others. Some DRAM types allow a group of multiple all-bank refreshes to be issued in a sequential manner as shown in FIG. 5. By doing so, the time it is required to perform the next group of refreshes is prolonged proportionately to the number of all-bank refreshes done in the group, which effectively increases the request window size accordingly. The advantage of this variation scheme is that as the request window is stretched much longer, the t4-overhead is then amortized over a longer window, hence reducing the overall deficiency caused by this overhead.

The two schedules must have a synchronized start for this scheme to work. This synchronized start can be accomplished through a handshake between the computer system and the DRAM controller, or simply having one directing the other after a system reset and the memory channels are trained.

More specifically, after a system reset, the memory channels of the TSP that are connected to the DRAM must first be trained before they can be used for transferring actual data. This training process is initiated as part of the booting sequence, the boot firmware queries all the DRAM controllers to start training the attached memory channels. The firmware polls the controllers until some flag in each controller indicating that the attached memory channel is now trained. The boot firmware will then finish other steps in the boot sequence. After the system boots, an operating system starts loading a compiled program to run. A compiled program does not need to know about the training because it is not loaded until after the training has finished.

However, the compiled program is aware of the delay time that corresponds to a worst case time between when the compiled program sends a request to the controller to when the response will be returned (e.g. t4 in FIG. 4) in this deterministic scheme. This worst case delay is pre-determined through simulation and information provided by the controller and DRAM vendors. This delay is then built into the compiler and used when it compiles the program.

Similarly, the compiler is aware of how long the refresh/maintenance windows will take. This is also provided by the controller and DRAM vendors ahead of time. These delays are also built into the compiler for this deterministic scheme to work.

The diagram only shows the scheduling of a single memory region, but this can be extended to cover multiple regions of the DRAM in the computer system. If the computer system is composed of multiple nodes, where each node has its own attached DRAM, a global synchronization start can be used to not only synchronize the schedules within a node, but across all regions in all nodes.

Figure 6:
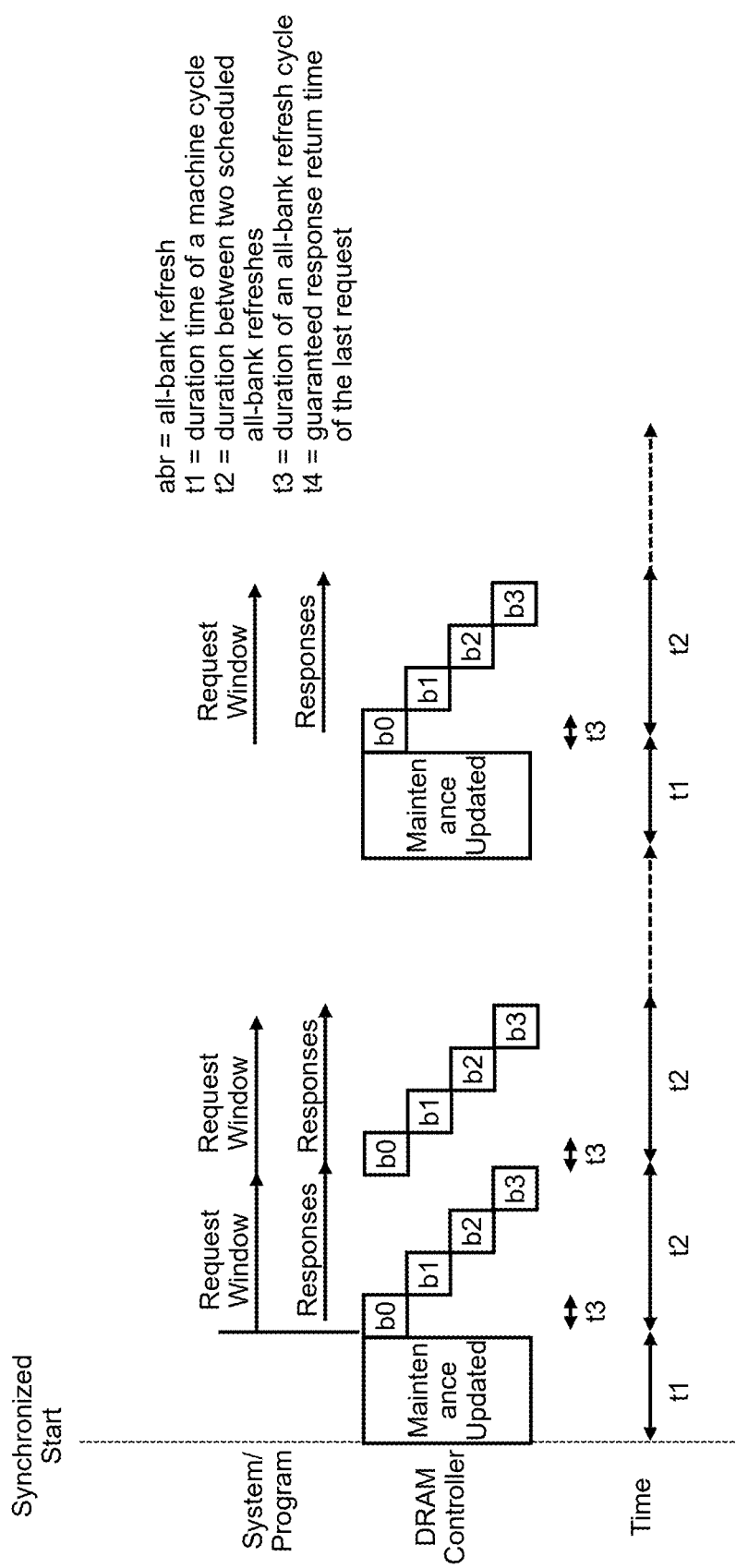
FIG. 6 depicts an alternative enabling embodiment for the self-calibration method in accordance with some embodiments disclosed herein.

This method also works if the DRAM controller uses the "per-bank" refresh instead of the "all-bank" refresh as shown in FIG. 6. In this example, the controller issues a per-bank refresh cycle for all the banks, one at a time, continuously. The computer system then makes access requests accordingly to avoid any conflicts. When bank0 is being refreshed, the system is still allowed to issue requests to all banks 1-3. When bank1 is being refreshed, requests to bank0, 2, and 3 are still allowed etc. The computer system must also be careful and not make requests to a bank that is soon to be refreshed such that the response can be returned in time without interruption. Certain types of DRAM may also allow the lumping of per-bank refreshes to the same bank, in which case this scheme may also take advantage of that to reduce the t4-overhead to the bank. As mentioned previously, during an all-bank refresh, multiple refreshes can be issued in a row to increase the request window size and reduce the t4-overhead penalty which helps to improve the overall efficiency. Similarly, in embodiments that utilize a per-bank refresh scheme, it may be possible for some DRAM types (manufacturer dependent) to utilize this same strategy to be used. So "lumping" here just means multiple per-bank refreshes can be issued in a row to have a similar effect.

This mutually exclusive scheduling can be done in several forms: 1) The computer system controls both the DRAM access and refresh/maintenance schedules. The computer system directs the DRAM controller to issue refresh/maintenance cycles when it is the right time. 2) The DRAM controller uses a fixed, known refresh/maintenance schedule that the computer system is aware of, so then the computer system schedules its accesses accordingly to avoid any conflict. 3) The computer system uses a fixed, known access schedule that the DRAM controller is aware of, and the DRAM controller would then schedule its refresh/maintenance cycles accordingly to avoid any conflict. 4) The DRAM controller and the computer system employ a scheduling approach that is a combination of more than one approach. By way of an example, a particular AI model may have a requirement for high bandwidth requirements so the computer system can request the DRAM controller to initiate a refresh/maintenance cycle at a selected time (e.g., earlier than the then-current schedule would require) so that access to a particular memory bank is available for access by the computer system at a selected time.

Regardless of which of the approaches to use, as long as the system and the DRAM controller work in a synchronous (or cooperative) manner to avoid collisions between DRAM access requests from the computer system and the refresh/maintenance cycles to the DRAM from the DRAM controller, the completion of these requests will be predictable with better latency and bandwidth performance.

Detailed Description—Technology Support from Data/Instructions to Processors/Programs Data and Information. While 'data' and 'information' often are used interchangeably (e.g., 'data processing' and 'information processing'), the term 'datum' (plural 'data') typically signifies a representation of the value of a fact (e.g., the measurement of a physical quantity such as the current in a wire, or the price of gold), or the answer to a question (e.g., "yes" or "no"), while the term 'information' typically signifies a set of data with structure (often signified by 'data structure'). A data structure is used in commerce to transform an electronic device for use as a specific machine as an article of manufacture (see In re Lowry, 32 F.3d 1579 [CAFC, 1994]). Data and information are physical objects, for example binary data (a 'bit', usually signified with '0' and '1') enabled with two levels of voltage in a digital circuit or electronic component. For example, data can be enabled as an electrical, magnetic, optical or acoustical signal or state; a quantum state such as a particle spin that enables a 'qubit'; or a physical state of an atom or molecule. All such data and information, when enabled, are stored, accessed, transferred, combined, compared, or otherwise acted upon, actions that require and dissipate energy.

As used herein, the term 'process' signifies an artificial finite ordered set of physical actions ('action' also signified by 'operation' or 'step') to produce at least one result Some types of actions include transformation and transportation. An action is a technical application of one or more natural laws of science or artificial laws of technology. An action often changes the physical state of a machine, of structures of data and information, or of a composition of matter. Two or more actions can occur at about the same time, or one action can occur before or after another action, if the process produces the same result. A description of the physical actions and/or transformations that comprise a process are often signified with a set of gerund phrases (or their semantic equivalents) that are typically preceded with the signifier 'the steps of' (e.g., "a process comprising the steps of measuring, transforming, partitioning and then distributing . . . "). The signifiers 'algorithm', 'method', 'procedure', '(sub)routine', 'protocol', 'recipe', and 'technique' often are used interchangeably with 'process', and 35 U.S.C. 100 defines a "method" as one type of process that is, by statutory law, always patentable under 35 U.S.C. 101. As used herein, the term 'thread' signifies a subset of an entire process. A process can be partitioned into multiple threads that can be used at or about at the same time.

As used herein, the term 'rule' signifies a process with at least one logical test (signified, e.g., by 'IF test IS TRUE THEN DO process'). As used herein, a 'grammar' is a set of rules for determining the structure of information. Many forms of knowledge, learning, skills and styles are authored, structured, and enabled—objectively—as processes and/or rules—e.g., knowledge and learning as functions in knowledge programming languages.

One of the most important components as goods in commerce is the integrated circuit, and its res of abstractions. As used herein, the term 'integrated circuit' signifies a set of connected electronic components on a small substrate (thus the use of the signifier 'chip') of semiconductor material, such as silicon or gallium arsenide, with components fabricated on one or more layers. Other signifiers for 'integrated circuit' include 'monolithic integrated circuit', 'IC', 'chip', 'microchip' and 'System on Chip' ('SoC'). Examples of types of integrated circuits include gate/logic arrays, processors, memories, interface chips, power controllers, and operational amplifiers. The term 'cell' as used in electronic circuit design signifies a specification of one or more components, for example, a set of transistors that are connected to function as a logic gate. Cells are usually stored in a database, to be accessed by circuit designers and design processes.

As used herein, the term 'module' signifies a tangible structure for acting on data and information. For example, the term 'module' can signify a process that transforms data and information, for example, a process comprising a computer program (defined below). The term 'module' also can signify one or more interconnected electronic components, such as digital logic devices. A process comprising a module, if specified in a programming language (defined below), such as System C or Verilog, also can be transformed into a specification for a structure of electronic components that transform data and information that produce the same result as the process. This last sentence follows from a modified Church-Turing thesis, which is simply expressed as "Whatever can be transformed by a (patentable) process and a processor, can be transformed by a (patentable) equivalent set of modules.", as opposed to the doublethink of deleting only one of the "(patentable)".

A module is permanently structured (e.g., circuits with unalterable connections), temporarily structured (e.g., circuits or processes that are alterable with sets of data), or a combination of the two forms of structuring. Permanently structured modules can be manufactured, for example, using Application Specific Integrated Circuits ('ASICs') such as Arithmetic Logic Units ('ALUs'), Programmable Logic Arrays ('PLAs'), or Read Only Memories ('ROMs'), all of which are typically structured during manufacturing. For example, a permanently structured module can comprise an integrated circuit. Temporarily structured modules can be manufactured, for example, using Field Programmable Gate Arrays (FPGAs—for example, sold by Xilink or Intel's Altera), Random Access Memories (RAMs) or microprocessors. For example, data and information is transformed using data as an address in RAM or ROM memory that stores output data and information. One can embed temporarily structured modules in permanently structured modules (for example, a FPGA embedded into an ASIC).

Modules that are temporarily structured can be structured during multiple time periods. For example, a processor comprising one or more modules has its modules first structured by a manufacturer at a factory and then further structured by a user when used in commerce. The processor can comprise a set of one or more modules during a first time period, and then be restructured to comprise a different set of one or modules during a second time period. The decision to manufacture or implement a module in a permanently structured form, in a temporarily structured form, or in a combination of the two forms, depends on issues of commerce such as cost, time considerations, resource constraints, tariffs, maintenance needs, national intellectual property laws, and/or specific design goals [FACT]. How a module is used, its function, is mostly independent of the physical form in which it is manufactured or enabled. This last sentence also follows from the modified Church-Turing thesis.

As used herein, the term 'processor' signifies a tangible data and information processing machine for use in commerce that physically transforms, transfers, and/or transmits data and information, using at least one process. A processor consists of one or more modules, e.g., a central processing unit ('CPU') module; an input/output ('I/O') module, a memory control module, a network control module, and/or other modules. The term 'processor' can also signify one or more processors, or one or more processors with multiple computational cores/CPUs, specialized processors (for example, graphics processors or signal processors), and their combinations. Where two or more processors interact, one or more of the processors can be remotely located relative to the position of the other processors. Where the term 'processor' is used in another context, such as a 'chemical processor', it will be signified and defined in that context.

The processor can comprise, for example, digital logic circuitry (for example, a binary logic gate), and/or analog circuitry (for example, an operational amplifier). The processor also can use optical signal processing, DNA transformations, quantum operations, microfluidic logic processing, or a combination of technologies, such as an optoelectronic processor. For data and information structured with binary data, any processor that can transform data and information using the AND, OR and NOT logical operations (and their derivatives, such as the NAND, NOR, and XOR operations) also can transform data and information using any function of Boolean logic. A processor such as an analog processor, such as an artificial neural network, also can transform data and information. No scientific evidence exists that any of these technological processors are processing, storing and retrieving data and information, using any process or structure equivalent to the bioelectric structures and processes of the human brain.

The one or more processors also can use a process in a 'cloud computing' or 'timesharing' environment, where time and resources of multiple remote computers are shared by multiple users or processors communicating with the computers. For example, a group of processors can use at least one process available at a distributed or remote system, these processors using a communications network (e.g., the Internet, or an Ethernet) and using one or more specified network interfaces ('interface' defined below) (e.g., an application program interface ('API') that signifies functions and data structures to communicate with the remote process).

As used herein, the term 'computer' and 'computer system' (further defined below) includes at least one processor that, for example, performs operations on data and information such as (but not limited to) the Boolean logical operations using electronic gates that can comprise transistors, with the addition of memory (for example, memory structured with flip-flops using the NOT-AND or NOT-OR operation). Any processor that can perform the logical AND, OR and NOT operations (or their equivalent) is Turing-complete and computationally universal [FACT]. A computer can comprise a simple structure, for example, comprising an I/O module, a CPU module, and a memory that performs, for example, the process of inputting a signal, transforming the signal, and outputting the signal with no human intervention.

As used herein, the term 'programming language' signifies a structured grammar for specifying sets of operations and data for use by modules, processors and computers. Programming languages include assembler instructions, instruction-set-architecture instructions, machine instructions, machine dependent instructions, microcode, firmware instructions, state-setting data, or either source code or object code written in any combination of one or more higher level languages, for example, the C programming language and similar general programming languages (such as Fortran, Basic, Javascript, PHP, Python, C++), knowledge programming languages (such as Lisp, Smalltalk, Prolog, or CycL), electronic structure programming languages (such as VHDL, Verilog, SPICE or SystemC), text programming languages (such as SGML, HTML, or XML), or audiovisual programming languages (such as SVG, MathML, X3D/VRML, or MIDI), and any future equivalent programming languages. As used herein, the term 'source code' signifies a set of instructions and data specified in text form using a programming language. A large amount of source code for use in enabling any of the claimed inventions is available on the Internet, such as from a source code library such as Github.

As used herein, the term 'program' (also referred to as an 'application program') signifies one or more processes and data structures that structure a module, processor or computer to be used as a "specific machine" (see In re *Alappat*, 33 F3d 1526 [CAFC, 1991]). One use of a program is to structure one or more computers, for example, standalone, client or server computers, or one or more modules, or systems of one or more such computers or modules. As used herein, the term 'computer application' signifies a program that enables a specific use, for example, to enable text processing operations, or to encrypt a set of data. As used herein, the term 'firmware' signifies a type of program that typically structures a processor or a computer, where the firmware is smaller in size than a typical application program, and is typically not very accessible to or modifiable by the user of a computer. Computer programs and firmware are often specified using source code written in a programming language, such as C. Modules, circuits, processors, programs and computers can be specified at multiple levels of abstraction, for example, using the SystemC programming language, and have value as products in commerce as taxable goods under the Uniform Commercial Code (sec U.C.C. Article 2, Part 1).

A program is transferred into one or more memories of the computer or computer system from a data and information device or storage system. A computer system typically has a device for reading storage media that is used to transfer the program, and/or has an interface device that receives the program over a network. This transfer is discussed in the General Computer Explanation section.

Detailed Description—Technology Support General Computer Explanation

Figure 7:
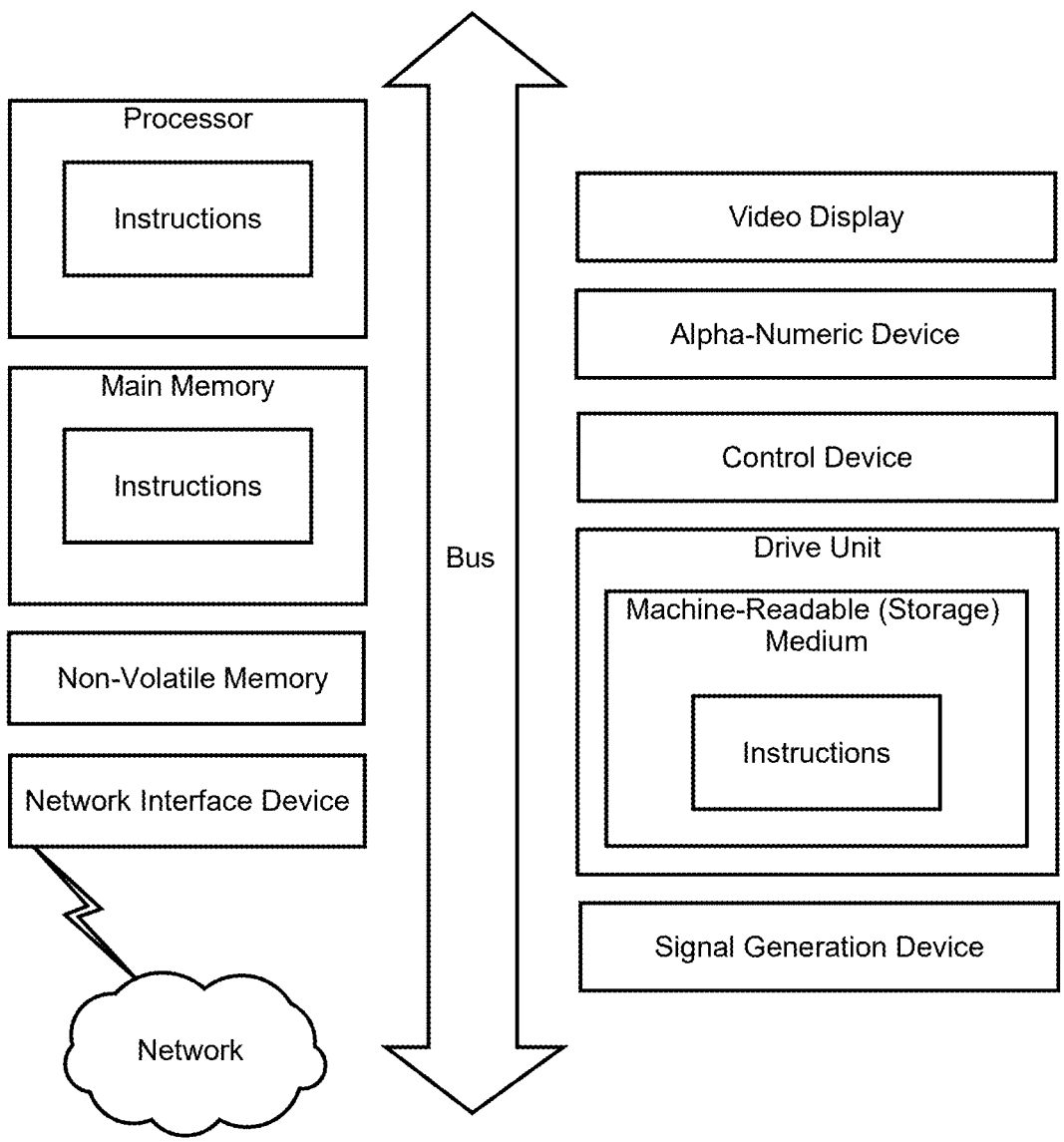
FIG. 7 depicts a processor-based system in accordance with some embodiments disclosed herein.

FIG. 7 depicts a computer system suitable for enabling embodiments of the claimed inventions.

In FIG. 7, the structure of computer system 710 typically includes at least one computer 714 which communicates with peripheral devices via bus subsystem 712. Typically, the computer includes a processor (e.g., a microprocessor, graphics processing unit, or digital signal processor), or its electronic processing equivalents, such as an Application Specific Integrated Circuit ('ASIC') or Field Programmable Gate Array ('FPGA'). Typically, peripheral devices include a storage subsystem 724, comprising a memory subsystem 726 and a file storage subsystem 728, user interface input devices 722, user interface output devices 720, and/or a network interface subsystem 716. The input and output devices enable direct and remote user interaction with computer system 710. The computer system enables significant post-process activity using at least one output device and/or the network interface subsystem.

The computer system can be structured as a server, a client, a workstation, a mainframe, a personal computer (PC), a tablet PC, a set-top box (STB), a personal digital assistant (PDA), a cellular telephone, a smartphone, a web appliance, a rack-mounted 'blade', a kiosk, a television, a game station, a network router, switch or bridge, or any data processing machine with instructions that specify actions to be taken by that machine. The term 'server', as used herein, refers to a computer or processor that typically performs processes for, and sends data and information to, another computer or processor.

A computer system typically is structured, in part, with at least one operating system program, such as Microsoft's Windows, Sun Microsystems's Solaris, Apple Computer's MacOs and iOS, Google's Android, Linux and/or Unix. The computer system typically includes a Basic Input/Output System (BIOS) and processor firmware. The operating system, BIOS and firmware are used by the processor to structure and control any subsystems and interfaces connected to the processor. Typical processors that enable these operating systems include: the Pentium, Itanium and Xeon processors from Intel; the Opteron and Athlon processors from Advanced Micro Devices; the Graviton processor from Amazon; the POWER processor from IBM; the SPARC processor from Oracle; and the ARM processor from ARM Holdings.

Any ECIN is limited neither to an electronic digital logic computer structured with programs nor to an electronically programmable device. For example, the claimed inventions can use an optical computer, a quantum computer, an analog computer, or the like. Further, where only a single computer system or a single machine is signified, the use of a singular form of such terms also can signify any structure of computer systems or machines that individually or jointly use processes. Due to the ever-changing nature of computers and networks, the description of computer system 710 depicted in FIG. 7 is intended only as an example. Many other structures of computer system 710 have more or less components than the computer system depicted in FIG. 7.

Network interface subsystem 716 provides an interface to outside networks, including an interface to communication network 718, and is coupled via communication network 718 to corresponding interface devices in other computer systems or machines. Communication network 718 can comprise many interconnected computer systems, machines and physical communication connections (signified by 'links'). These communication links can be wireline links, optical links, wireless links (e.g., using the WiFi or Bluetooth protocols), or any other physical devices for communication of information. Communication network 718 can be any suitable computer network, for example a wide area network such as the Internet, and/or a local-to-wide area network such as Ethernet. The communication network is wired and/or wireless, and many communication networks use encryption and decryption processes, such as is available with a virtual private network. The communication network uses one or more communications interfaces, which receive data from, and transmit data to, other systems. Embodiments of communications interfaces typically include an Ethernet card, a modem (e.g., telephone, satellite, cable, or ISDN), (asynchronous) digital subscriber line (DSL) unit, Firewire interface, USB interface, and the like. Communication algorithms ('protocols') can be specified using one or communication languages, such as HTTP, TCP/IP, RTP/RTSP, IPX and/or UDP.

User interface input devices 722 can include an alphanumeric keyboard, a keypad, pointing devices such as a mouse, trackball, toggle switch, touchpad, stylus, a graphics tablet, an optical scanner such as a bar code reader, touchscreen electronics for a display device, audio input devices such as voice recognition systems or microphones, eye-gaze recognition, brainwave pattern recognition, optical character recognition systems, and other types of input devices. Such devices are connected by wire or wirelessly to a computer system. Typically, the term 'input device' signifies all possible types of devices and processes to transfer data and information into computer system 710 or onto communication network 718. User interface input devices typically enable a user to select objects, icons, text and the like that appear on some types of user interface output devices, for example, a display subsystem.

User interface output devices 720 can include a display subsystem, a printer, a fax machine, or a non-visual communication device such as audio and haptic devices. The display subsystem can include a cathode ray tube (CRT), a flat-panel device such as a liquid crystal display (LCD), an image projection device, or some other device for creating visible stimuli such as a virtual reality system. The display subsystem also can provide non-visual stimuli such as via audio output, aroma generation, or tactile/haptic output (e.g., vibrations and forces) devices. Typically, the term 'output device' signifies all possible types of devices and processes to transfer data and information out of computer system 710 to the user or to another machine or computer system. Such devices are connected by wire or wirelessly to a computer system. Note: some devices transfer data and information both into and out of the computer, for example, haptic devices that generate vibrations and forces on the hand of a user while also incorporating sensors to measure the location and movement of the hand. Technical applications of the sciences of ergonomics and semiotics are used to improve the efficiency of user interactions with any processes and computers disclosed herein, such as any interactions with regards to the design and manufacture of circuits, that use any of the above input or output devices.

Memory subsystem 726 typically includes a number of memories including a main random-access memory ('RAM') 730 (or other volatile storage device) for storage of instructions and data during program execution and a read only memory ('ROM') 732 in which fixed instructions are stored. File storage subsystem 728 provides persistent storage for program and data files, and can include a hard disk drive, a floppy disk drive along with associated removable media, a CD-ROM drive, an optical drive, a flash memory such as a USB drive, or removable media cartridges. If computer system 710 includes an input device that performs optical character recognition, then text and symbols printed on paper can be used as a device for storage of program and data files. The databases and modules used by some embodiments can be stored by file storage subsystem 728.

Bus subsystem 712 provides a device for transmitting data and information between the various components and subsystems of computer system 710. Although bus subsystem 712 is depicted as a single bus, alternative embodiments of the bus subsystem can use multiple busses. For example, a main memory using RAM can communicate directly with file storage systems using Direct Memory Access ('DMA') systems.

A program or data transferred into and out of a processor from such a memory can be transformed into a physical signal that is propagated through a medium (such as a network, connector, wire, or circuit trace as an electrical pulse); or through a medium such as space or an atmosphere as an acoustic signal, or as electromagnetic radiation with wavelengths in the electromagnetic spectrum longer than infrared light).

Detailed Description—Conclusion

The Detailed Description signifies in isolation the individual features, structures, functions, or characteristics described herein and any combination of two or more such features, structures, functions or characteristics, to the extent that such features, structures, functions or characteristics or combinations thereof are enabled by the Detailed Description as a whole in light of the knowledge and understanding of a skilled person, irrespective of whether such features, structures, functions or characteristics, or combinations thereof, solve any problems disclosed herein, and without limitation to the scope of the Claims of the patent. When an ECIN comprises a particular feature, structure, function or characteristic, it is within the knowledge and understanding of a skilled person to use such feature, structure, function, or characteristic in connection with another ECIN whether or not explicitly described, for example, as a substitute for another feature, structure, function or characteristic.

In view of the Detailed Description, a skilled person will understand that many variations of any ECIN can be enabled, such as function and structure of elements, described herein while being as useful as the ECIN. One or more elements of an ECIN can be substituted for one or more elements in another ECIN, as will be understood by a skilled person. Writings about any ECIN signify its use in commerce, thereby enabling other skilled people to similarly use this ECIN in commerce.

This Detailed Description is fitly written to provide knowledge and understanding. It is neither exhaustive nor limiting of the precise structures described, but is to be accorded the widest scope consistent with the disclosed principles and features. Without limitation, any and all equivalents described, signified or Incorporated by Reference (or explicitly incorporated) in this patent application are specifically incorporated into the Detailed Description. In addition, any and all variations described, signified or incorporated with respect to any one ECIN also can be included with any other ECIN. Any such variations include both currently known variations as well as future variations, for example any element used for enablement includes a future equivalent element that provides the same function, regardless of the structure of the future equivalent element.

It is intended that the domain of the set of claimed inventions and their embodiments be defined and judged by the following Claims and their equivalents. The Detailed Description includes the following Claims, with each Claim standing on its own as a separate claimed invention. Any ECIN can have more structure and features than are explicitly specified in the Claims.

What is claimed is:

1. A computer system for executing a program on a processor comprising a compiler for generating an explicit plan for how the processor will execute the program by specifying a deterministic schedule wherein the explicit plan for execution includes information for explicit prediction of when data will be read from an external memory while executing the program.

2. The computer system of claim 1, further comprising an assembler for receiving compiled programs from the compiler to generate a compiled binary.

3. The computer system of claim 2, wherein the assembler maps the scheduled instructions indicated in the compiled program to the hardware of the processor, and then determines the exact component queue in which to place each instruction.

4. The computer system of claim 2, wherein the processor accepts the compiled binary assembled by the assembler, and executes the instructions included in the compiled binary wherein the processor has circuitry for matrix arithmetic, numerical conversion, vector computation, short-term memory, and data permutation/switching.

5. The computer system of claim 4, wherein the processor further comprises multiple processors connected together, and each processor is coupled to an external memory.

6. The computer system of claim 4, wherein the external memory is a DRAM, and read/write requests are guaranteed to be mutually exclusive from the refresh and maintenance cycles of the DRAM.

7. The computer system of claim 6, further comprising a DRAM controller that uses the "all-bank" method to periodically refresh all the banks simultaneously wherein each all-bank refresh and maintenance cycle is included in the deterministic schedule.

8. The computer system of claim 7, wherein the system issues read/write requests for execution during a request window.

9. The computer system of claim 7, wherein the system uses the deterministic schedule to determine when to stop issuing read/write requests to the DRAM to ensure that a refresh or maintenance cycle does not start before the response of an issued request can be returned.

10. The computer system of claim 9, wherein the deterministic schedule defines the request window based on the type of DRAM being accessed.

11. The computer system of claim 7, wherein the deterministic schedule includes a synchronized start for that includes a handshake between a computer system and the DRAM controller.

12. The computer system of claim 11, wherein a predetermined worst case memory of each memory channel delay is used by the compiler when it compiles the program.

13. The computer system of claim 12, wherein a predetermined refresh/maintenance window is used by the compiler when it compiles the program.

14. A method for executing a program on a processor comprising a compiler for generating an explicit plan for how the processor will execute the program by specifying a deterministic schedule wherein the explicit plan for execution includes information for explicit prediction of when data will be read from an external memory while executing the program.

15. The method of claim 14, wherein the external memory is a plurality of non-deterministic banks of DRAM and the compiler schedules external memory read/write requests to one of the plurality of banks of DRAM during a request window.

16. The method of claim 15, wherein the compiler uses the deterministic schedule to determine when to stop scheduling read/write requests to one of a plurality of banks of DRAM to ensure that a refresh or maintenance cycle does not start before the response of an issued request can be returned.

17. The system of claim 15, wherein the deterministic schedule defines the request window based on the type of DRAM being accessed.

18. The method of claim 16, wherein a DRAM controller uses a "per-bank" refresh.

19. The method of claim 16, wherein a DRAM controller uses an "all-bank" refresh and sequentially issues a per-bank refresh cycle for all the banks and the compiler schedules access requests accordingly to avoid any conflicts.

20. The method of claim 16, wherein a DRAM controller issues multiple per-bank refreshes to define the request window.

21. A computer system for executing a program on a processor comprising:
a compiler for generating an explicit plan for how the processor will execute the program by specifying a deterministic schedule wherein the explicit plan for execution includes information for explicit prediction of when data will be read from an external memory while executing the program; and
a DRAM controller provides a request window based on a deterministic schedule wherein the explicit plan for execution includes information for explicit prediction of when data will be read from an external memory or written to the external memory while executing the program wherein the deterministic schedule processor directs the DRAM controller to selectively:
1) issue refresh/maintenance cycles according to the deterministic schedule; or
2) the DRAM controller adheres to a fixed, known refresh/maintenance schedule that the processor is aware of; or
3) processor uses a fixed, known access schedule that the DRAM controller is aware of; or
4) the DRAM controller and the computer system employ a scheduling approach that is a combination of more than one approach wherein the processor and the DRAM controller work in a synchronous manner to avoid collisions between DRAM access requests from the processor and the refresh/maintenance cycles to the DRAM issued by the DRAM controller.

22. A method to manage periodic refresh and maintenance scheduling for a DRAM array to obtain a predictable DRAM data access behavior so that the DRAM array operates in a deterministic manner in conjunction with a deterministic processor.

* * * * *